United States Patent
Delaney et al.

(10) Patent No.: US 11,556,694 B1
(45) Date of Patent: Jan. 17, 2023

(54) PREDICTIVE ASPECT FORMATTING

(71) Applicant: Lenovo (Singapore) Pte. Ltd., Singapore (SG)

(72) Inventors: Mark Delaney, Raleigh, NC (US); John C Mese, Cary, NC (US); Russell Speight VanBlon, Raleigh, NC (US); Nathan Peterson, Oxford, NC (US); Arnold Weksler, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/522,069

(22) Filed: Nov. 9, 2021

(51) Int. Cl.
*G06F 17/00* (2019.01)
*G06F 40/109* (2020.01)
*G06F 40/20* (2020.01)
*H04L 51/52* (2022.01)

(52) U.S. Cl.
CPC .......... *G06F 40/109* (2020.01); *G06F 40/20* (2020.01); *H04L 51/52* (2022.05)

(58) Field of Classification Search
CPC ......... G06F 40/109; G06F 40/20; H04L 51/52
See application file for complete search history.

(56) References Cited

U.S. PATENT DOCUMENTS

| | | | | |
|---|---|---|---|---|
| 9,459,778 | B2 * | 10/2016 | Hogeg | H04M 1/72445 |
| 10,049,477 | B1 * | 8/2018 | Kokemohr | G06T 11/60 |
| 10,891,419 | B2 * | 1/2021 | Abou Mahmoud | G06F 40/109 |
| 11,330,335 | B1 * | 5/2022 | Loritsch | G06F 3/165 |
| 11,342,069 | B2 * | 5/2022 | Iantorno | G16H 40/67 |
| 2006/0047704 | A1 * | 3/2006 | Gopalakrishnan | G06F 16/51 707/E17.031 |
| 2006/0271526 | A1 * | 11/2006 | Charnock | G06Q 30/02 |
| 2008/0229213 | A1 * | 9/2008 | Hamilton | G06Q 10/10 715/751 |
| 2013/0187926 | A1 * | 7/2013 | Silverstein | G06F 40/143 345/440 |
| 2013/0193201 | A1 * | 8/2013 | Bradley | G06F 16/23 705/26.61 |
| 2014/0033018 | A1 * | 1/2014 | Pallai | G06F 16/972 715/234 |
| 2015/0066993 | A1 * | 3/2015 | Donabedian | G06F 16/13 707/803 |
| 2015/0269125 | A1 * | 9/2015 | Desai | G06Q 10/107 715/752 |
| 2016/0212087 | A1 * | 7/2016 | Nelson | H04L 51/212 |
| 2017/0147202 | A1 * | 5/2017 | Donohue | G06F 3/04886 |
| 2022/0051290 | A1 * | 2/2022 | Manning | G06Q 30/0277 |
| 2022/0157342 | A1 * | 5/2022 | Kliushkin | G11B 27/06 |

* cited by examiner

*Primary Examiner* — Laurie A Ries
(74) *Attorney, Agent, or Firm* — Ference & Associates LLC

(57) ABSTRACT

One embodiment provides a method, including: identifying, on an information handling device, a communication between a first user and at least one other individual; determining, based upon an analysis of context data associated with the communication, that an indication exists to implement a visual change to an aspect of the communication; and; implementing, responsive to the determining, the visual change to the aspect. Other aspects are described and claimed.

16 Claims, 3 Drawing Sheets

PREDICTIVE ASPECT FORMATTING

BACKGROUND

Individuals frequently utilize their information handling devices ("devices"), for example smart phones, tablets, laptops and/or personal computers, and the like, to communicate with one another. For example, an individual may transmit a communication to another individual via text message, email, social media message, chat room message, etc. The formatting of one or more portions of a communication may be manually adjusted to better convey a composing individuals' message and/or to emphasize an aspect of the communication.

BRIEF SUMMARY

In summary, one aspect provides a method, including: identifying, on an information handling device, a communication between a first user and at least one other individual; determining, based upon an analysis of context data associated with the communication, that an indication exists to implement a visual change to an aspect of the communication; and implementing, responsive to the determining, the visual change to the aspect.

Another aspect provides an information handling device, including: a processor; a memory device that stores instructions executable by the processor to: identify a communication between a first user and at least one other individual; determine, based upon an analysis of context data associated with the communication, that an indication exists to implement a visual change to an aspect of the communication; and implement, responsive to the determining, the visual change to the aspect.

A further aspect provides a product, including: a storage device that stores code, the code being executable by a processor and comprising: code that identifies a communication between a first user and at least one other individual; code that determines, based upon an analysis of context data associated with the communication, that an indication exists to implement a visual change to an aspect of the communication; and code that implements, responsive to the code that determines, the visual change to the aspect.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
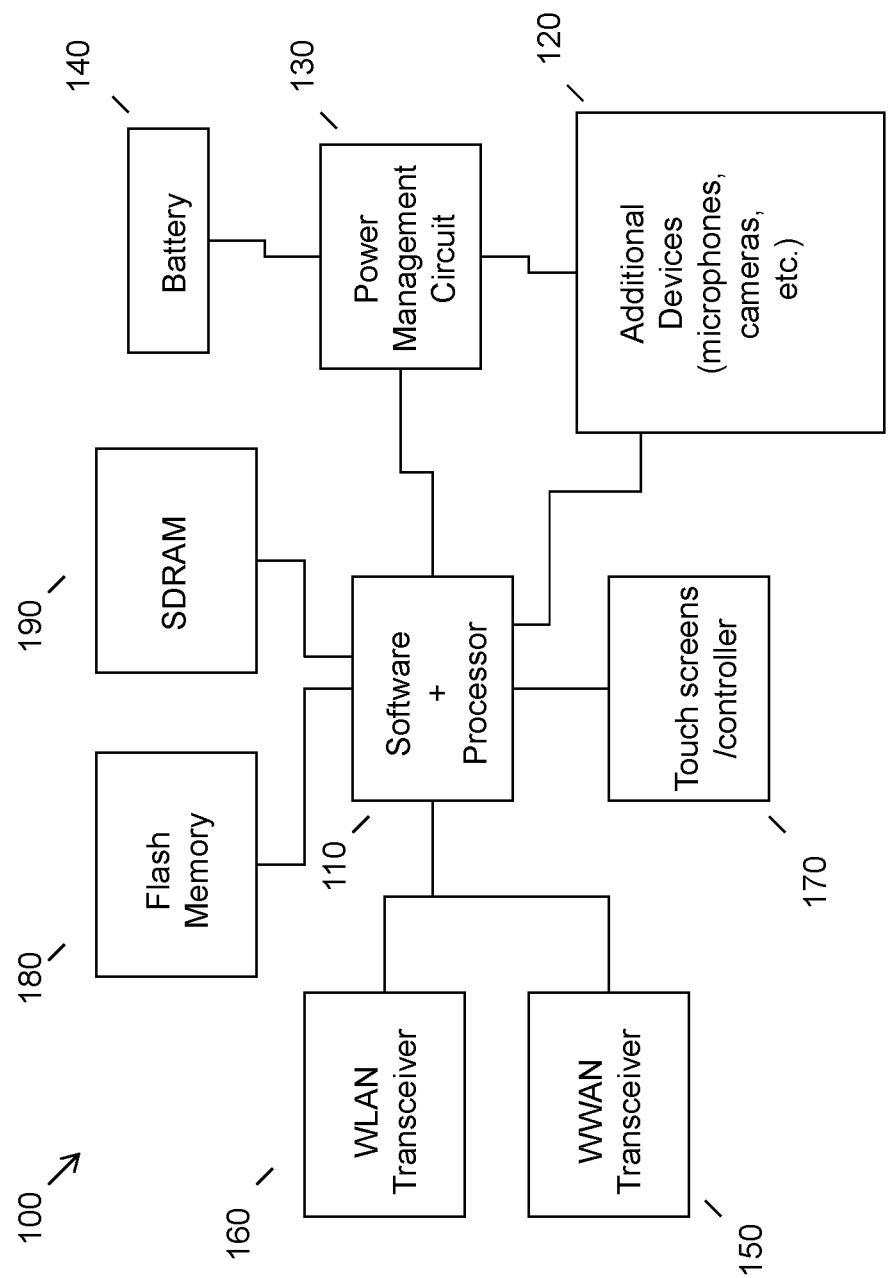
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

With the advent of digital communication in a remote world, users often leverage formatting to rich text to better convey a message and/or to emphasize a point. Common formatting adjustments include changes to the color, size, and/or other typographical features of a portion of a communication. For example, a document-editing user may respond to a document-submitting user with the email "I have reviewed your document and provided my edits in blue below". Conventional methods of formatting are manual in nature and are configured case by case by the composing user. A solution is therefore required that anticipates the rich text formatting characteristics that a user will require for future composition relative to the contextual clues within a body of the communication.

Accordingly, an embodiment provides a method for automatically implementing formatting changes to portions of a communication based upon context data associated with the communication. In an embodiment, a communication between a first user and at least one other individual may be identified. An embodiment may then determine that an indication exists within the communication to implement a formatting change to an aspect of the communication. This determination may be facilitated by analyzing context data associated with the communication. Thereafter, an embodiment may automatically implement the formatting change to the relevant aspect of the communication. Such a method may reduce a user's conventional burden in implementing formatting changes manually.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
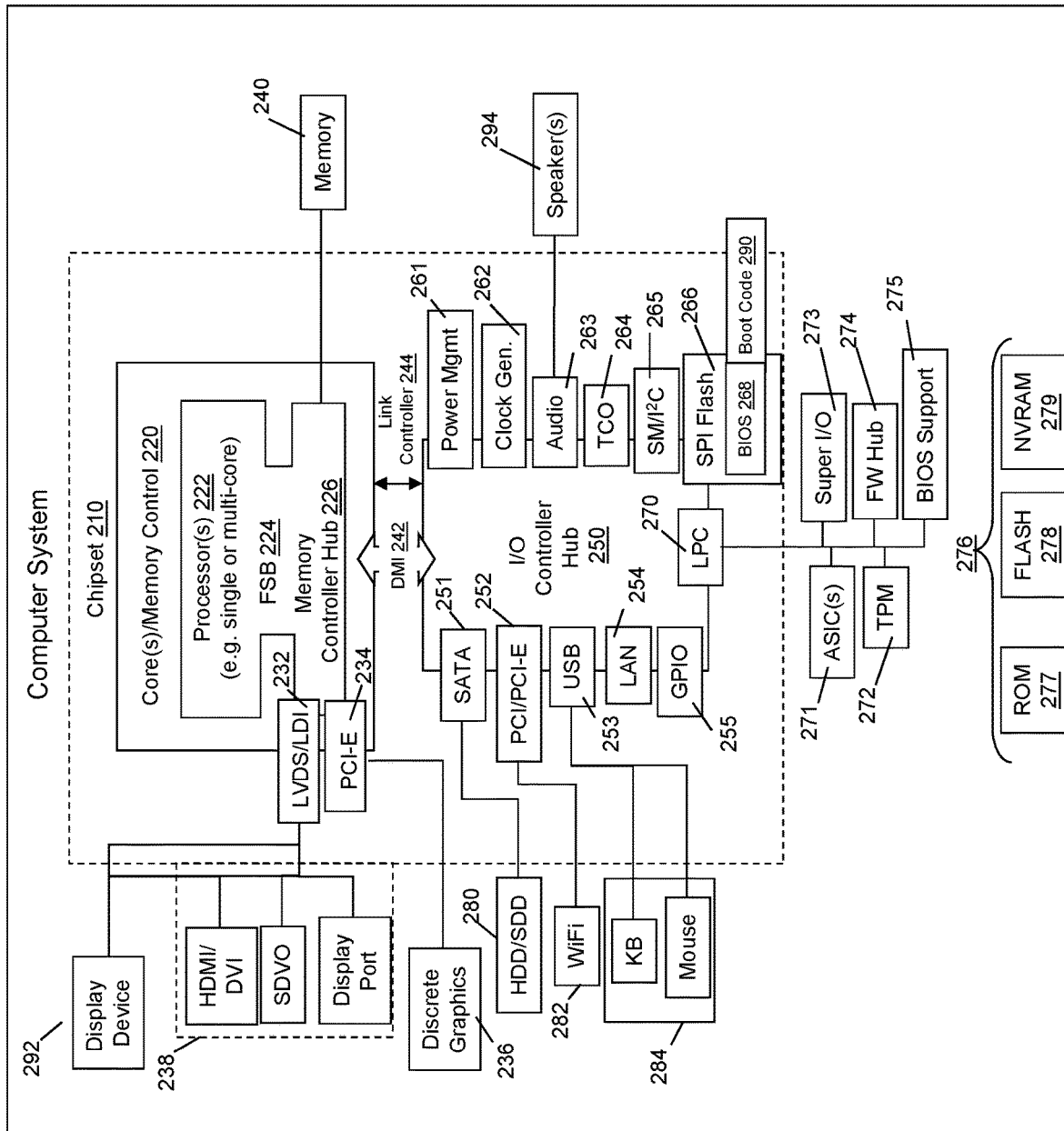
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling circuitry, as for example outlined in FIG. 1 or FIG. 2, may be used in computing devices that enable a user to transmit communication to at least one other individual. For example, the circuitry outlined in FIG. 1 may be implemented in a smart phone, whereas the circuitry outlined in FIG. 2 may be implemented into a laptop computer.

Figure 3:
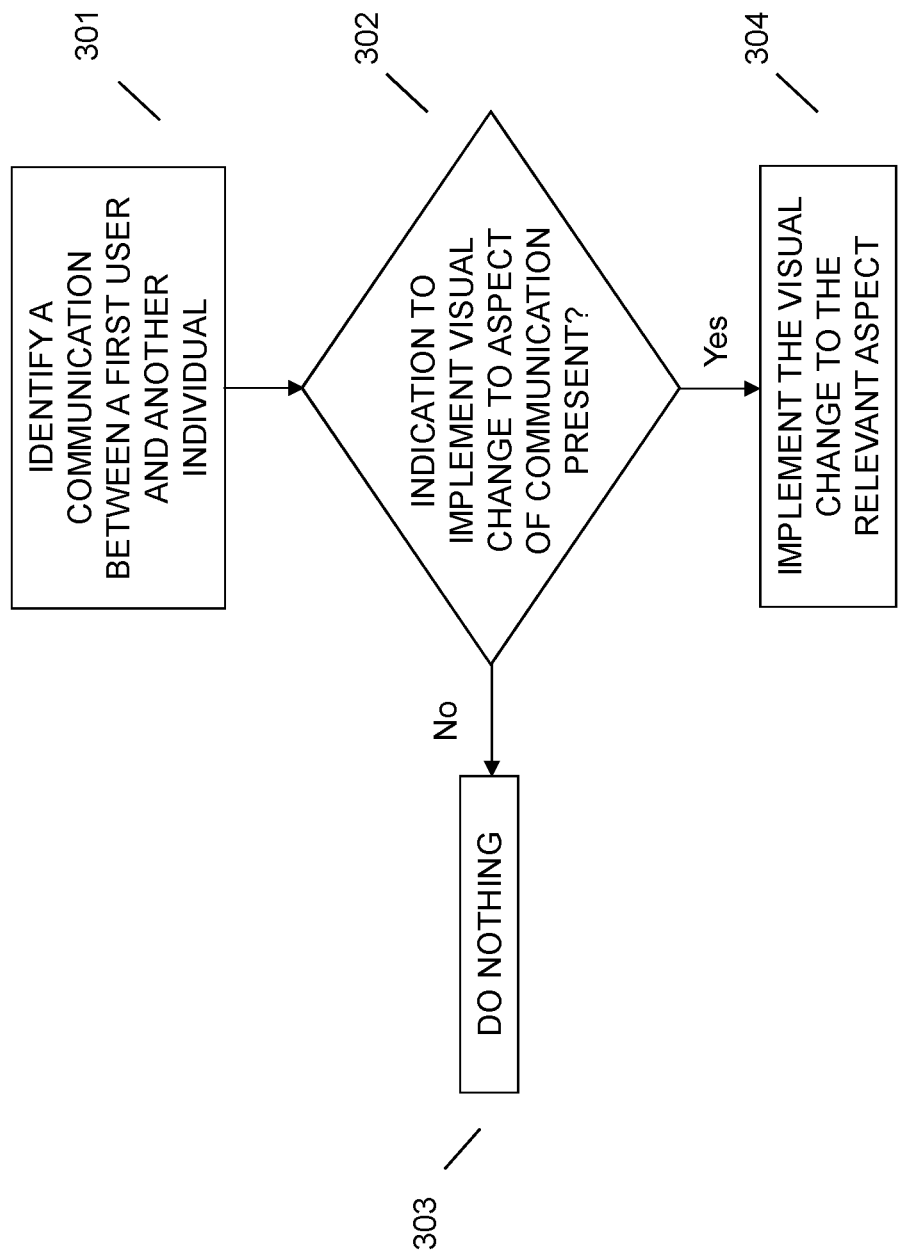
FIG. 3 illustrates an example method of automatically formatting a portion of a communication.

Referring now to FIG. 3, an embodiment provides a method of automatically formatting content in a communication based upon context data associated with the communication. At 301, an embodiment may identify a communication between a first user and at least one other individual. In the context of this application, the communication may be any of: an email, a text message, a social media message, a chat message in a virtual conference or meeting room, etc. In an embodiment, the communication may be a communication that is received by the user from another individual or vice versa (i.e., a communication that the user is authoring to one or more other individuals). In an embodiment, the identification process may be facilitated, for example, by identifying that a communication is open and/or active on an application running on the user's device.

At 302, an embodiment may determine that an indication exists to implement a visual formatting change to an aspect of the communication. In an embodiment, the aspect of the communication may refer to a portion of text (e.g., a word, a phrase, a paragraph, etc.) or a visual media article (e.g., an image, a video, etc.). This aspect may be resident within the communication (e.g., in a body of the current communication, a body of a previous communication in the same communication string as the current communication, etc.) or associated with the communication in some way (e.g., resident in a document or file attached to the communication, etc.). In an embodiment, the visual formatting change may refer to one or more of a color change, a size change, or a typographical change (e.g., bolding the aspect, italicizing the aspect, crossing the aspect, etc.).

In an embodiment, the indication may be predicated on the presence of context data associated with the communication. In an embodiment, the context data may correspond to content within the communication. For example, the content may be a statement or comment made by one user to another. As another example, the content may be a body of text that is referenced or discussed by the communicants or otherwise contained within the communication. In another embodiment, the context data may correspond to content that may not be bound within the communication but may be associated with it in some way. For example, the content may be attached to the communication as a file or a document. As another example, the content may be a ruleset that is contained within, or that is accessible by, an application managing the communication. As yet another example, the content may be resident in an email header or description.

In an embodiment, the determination may be facilitated by first analyzing the context data (e.g., using one or more text analysis techniques known in the art, etc.) to identify the words present in the context data and their relationships to each other. An embodiment may then access a database (e.g., stored locally on the device, stored remotely on another device or server, etc.) that contains one or more pre-defined triggers (i.e., words or phrases that provide an indication to the system that a formatting change should be implemented). These triggers may be originally designated by a manufacturer of the device or programmer of the application and may later be adjusted by a user. An embodiment may then compare the triggers in the database to the analysis result of the context data to determine if the context data contains any indications (i.e., any triggers) to initiate a formatting change to an aspect of the communication.

As a non-limiting example of the foregoing concept, an embodiment may identify that a user authored an email to another individual. The email may contain a message from the user that states "I have reviewed your work and made changes in blue below". Based upon the analysis of the statement and with comparison to the pre-defined triggers database, an embodiment may conclude that a user wants all the changes they made to a document (or a previous communication) associated with the another individual to be highlighted in blue.

In another embodiment, the determination may be facilitated by identifying that a formatting legend associated with the communication exists. In the context of this application, the formatting legend may a chart (e.g., constructed by a user, etc.) that specifies the formatting changes that will occur to different aspects of the communication. It is important to note that formatting legend may appear as virtually any type of chart so long as it specifies the association between the portions of the communication that will be formatted and the types of formatting occurring at each portion. In an embodiment, the formatting legend may be present within the body of the communication or may exist elsewhere (e.g., on the user's device, within the application, etc.). An embodiment may thereafter analyze the communication to identify the portions of the communication that will be subject to each formatting change.

As a non-limiting example of the foregoing concept, an embodiment may identify an email being broadcast from one user to another. The email may have an attachment corresponding to a transcription of a conference call. An embodiment may identify that a formatting legend exists within the body of the email that identifies the color associated with each speaker in the transcription. For instance, the email may contain a statement such as "Here is the summary of our conference call. It is color-coded by speaker based on the chart below for the sake of clarity:
John=Green;
Robert=Blue
Jordan=Green
Nate=Yellow"

Responsive to determining, at 302, that an indication does not exist to implement a visual formatting change to an aspect of the communication, an embodiment may, at 303, take no additional action. Conversely, responsive to determining, at 302, that an indication does exist to implement a visual formatting change to an aspect of the communication, an embodiment may, at 304, implement the visual formatting change to the aspect. In an embodiment, the implementation of this formatting change may be done automatically in response to the determination, i.e., without the receipt of any additional formatting input from a user.

In an embodiment, the identified formatting change may be implemented on the aspect identified in the context data. For example, in the situation where an individual states that "all my changes appear in blue below", an embodiment may dynamically change the color of each edit a user has made (e.g., addition, deletion, format change, etc.) to blue. As another example, in the situation where a formatting legend exists that identifies the color associated with the transcriptions for each speaker, an embodiment may dynamically change the color of the relevant portions of the transcribed document based upon the chart in the formatting legend.

In an embodiment, the identified formatting changes may be preserved and applied to subsequent communications. For instance, the formatting change identified from a user in a first communication resulting from the statement "all my edits to the document below appear in blue" may be dynamically applied to subsequent communications in that email string. More particularly, if the user edits other portions of subsequent emails in the email string, those edits will also appear in blue. The same concept is applicable with respect to a formatting legend. More particularly, aspects of subsequent emails will follow for the formatting changes identified in an initial/primary formatting legend.

In an embodiment, users may provide feedback regarding the dynamic changes made to the communication. Stated differently, users may inform a system whether the intended portions of a communication were correctly formatted. This feedback may be utilized by a system to optimize a content analysis and/or formatting implementation process. As an example of the foregoing, after a formatting change has been made to a portion of a communication, a user may provide positive or negative feedback to the system regarding the formatting change. This feedback may be provided to the system in one or more ways (e.g., by confirming or denying a formatting change in response to receipt of a change confirmation query, by selecting an undo action on a formatted portion of the communication, etc.). The system may thereafter utilize this feedback to better format portions in subsequent communications.

The various embodiments described herein thus represent a technical improvement to conventional methods for implementing a visual change to an aspect of a communication. Using the techniques described herein, an embodiment may identify a communication occurring between a first user and one or more other individuals. An embodiment may thereafter determine that an indication exists to implement a visual formatting change to an aspect of the communication. Responsive to the determination, an embodiment may automatically implement the formatting change to the relevant portion of the communication. Such a method may therefore eliminate the need for a user to manually institute formatting changes to a communication.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   identifying, on an information handling device, a communication between a first user and at least one other individual;
   determining, based upon an analysis of context data associated with the communication, that an indication exists to implement a visual change to an aspect of the communication, wherein the visual change is a formatting change and wherein the aspect is an article of content designated within the communication, wherein the determining further comprises:
     analyzing, using a text analysis protocol, content of the communication;
     accessing, using the information handling device, a database comprising at least one visual change trigger;
     comparing the content of the communication to the at least one visual change trigger; and
     determining, based on the comparing, that the indication exists to implement the visual change responsive to identifying that at least a portion of the content of the communication comprises the at least one visual change trigger; and
   implementing, responsive to the determining, the visual change to the aspect.

2. The method of claim 1, wherein the communication is selected from the group consisting of: an email correspondence, a text message, a social media message, and a chatroom message.

3. The method of claim 1, wherein the formatting change is selected from the group consisting of: a color change, a size change, a typographical emphasis, and combinations thereof.

4. The method of claim 1, wherein the article of content is at least one of a text segment or a visual media article.

5. The method of claim 1, wherein the determining comprises identifying that a formatting legend exists that is associated with the communication.

6. The method of claim 1, wherein the implementing comprises automatically implementing the visual change without additional user input.

7. The method of claim 1, further comprising:
   identifying an association between a subsequent communication and the communication;
   determining, using a processor, whether the aspect is present in the subsequent communication; and
   implementing the visual change to the aspect present in the subsequent communication.

8. The method of claim 1, further comprising:
   receiving, subsequent to the implementing, user feedback regarding the visual change to the aspect; and
   adjusting, based on the user feedback, a protocol for implementation of the visual change.

9. An information handling device, comprising:
   a processor;
   a memory device that stores instructions executable by the processor to:

identify a communication between a first user and at least one other individual;

determine, based upon an analysis of context data associated with the communication, that an indication exists to implement a visual change to an aspect of the communication, wherein the visual change is a formatting change and wherein the aspect is an article of content designated within the communication, wherein the instructions executable by the processor to determine comprise instructions executable by the processor to:

analyze, using a text analysis protocol, content of the communication;

access, using the information handling device, a database comprising at least one visual change trigger;

compare the content of the communication to the at least one visual change trigger; and determine, based on the comparing, that the indication exists to implement the visual change responsive to identifying that at least a portion of the content of the communication comprises the at least one visual change trigger; and implement, responsive to the determining, the visual change to the aspect.

10. The information handling device of claim 9, wherein the communication is selected from the group consisting of: an email correspondence, a text message, a social media message, and a chatroom message.

11. The information handling device of claim 9, wherein the formatting change is selected from the group consisting of: a color change, a size change, a typographical emphasis, and combinations thereof.

12. The information handling device of claim 9, wherein the article of content is at least one of a text segment or a visual media article.

13. The information handling device of claim 9, wherein the instructions executable by the processor to determine comprise instructions executable by the processor to identify that a formatting legend exists that is associated with the communication.

14. The information handling device of claim 9, wherein the instructions are further executable by the processor to:

identify an association between a subsequent communication and the communication;

determine, using a processor, whether the aspect is present in the subsequent communication; and implement the visual change to the aspect present in the subsequent communication.

15. The information handling device of claim 9, wherein the instructions are further executable by the processor to:

receive, subsequent to the implementing, user feedback regarding the visual change to the aspect; and adjust, based on the user feedback, a protocol for implementation of the visual change.

16. A product, comprising:

a storage device that stores code, the code being executable by a processor and comprising:

code that identifies a communication between a first user and at least one other individual;

code that determines, based upon an analysis of context data associated with the communication, that an indication exists to implement a visual change to an aspect of the communication, wherein the visual change is a formatting change and wherein the aspect is an article of content designated within the communication, wherein the code that determines comprises instructions executable by the processor to:

analyze, using a text analysis protocol, content of the communication;

access, using the information handling device, a database comprising at least one visual change trigger;

compare the content of the communication to the at least one visual change trigger; and determine, based on the comparing, that the indication exists to implement the visual change responsive to identifying that at least a portion of the content of the communication comprises the at least one visual change trigger; and code that implements, responsive to the code that determines, the visual change to the aspect.

* * * * *